March 18, 1969 R. I. MINCHOM 3,432,941

DEMONSTRATION OF MAGNETIC PHENOMENA

Filed Feb. 11, 1966 Sheet 1 of 2

United States Patent Office 3,432,941

Patented Mar. 18, 1969

3,432,941

DEMONSTRATION OF MAGNETIC PHENOMENA

Raphael Isaac Minchom, 15 Cheyne Walk, Hendon, London NW. 4, England

Filed Feb. 11, 1966, Ser. No. 526,792

Claims priority, application Great Britain, Feb. 19, 1965 7,350/65

U.S. Cl. 35—19 10 Claims

Int. Cl. G09b *23/18*

ABSTRACT OF THE DISCLOSURE

A magnetic element for demonstrating magnetic phenomena comprising a cylindrical rod having a ferromagnetic core whose ends are exposed and a cllindrical layer of nonmagnetic material which has substantial thickness and which covers the cylindrical surface of said rod, said rod having a length less than one centimeter.

Figure 1:
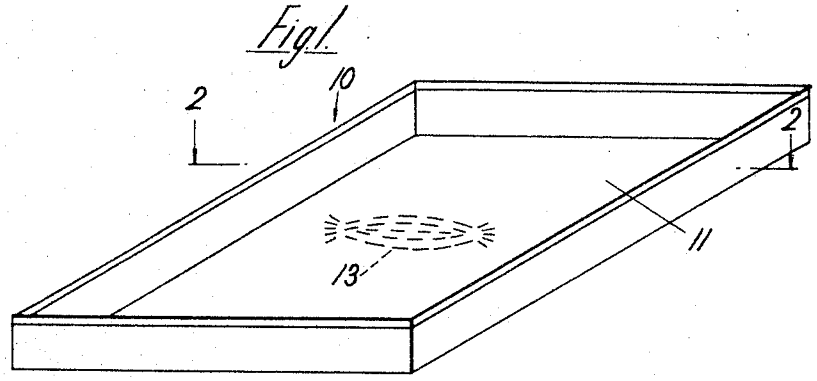

An apparatus for demonstrating magnetic phenomena with the aid of the magnetic elements is also disclosed. This apparatus comprises a sealed container within which are exposed a plurality of the magnetic elements, the container having a transparent portion through which the disposition of the magnetic elements may be seen.

This invention concerns improvements relating to the demonstration of magnetic phenomena, such for example as magnetic lines of force, magnetic domains, induced magnetism, and magnetic saturation.

A common method of demonstrating magnetic lines of force is to sprinkle on a sheet of paper magnetic particles such as finely sieved iron filings, to place a magnet beneath the sheet, and then to tap the sheet. The magnetic particles then become magnetised by the magnetic field from the said magnet and join together along lines approximately representing the magnetic lines of force.

These magnetic particles, however, tend to cling to each other and do not move freely over the sheet of paper when changes occur in the magnetic field.

According therefore to the present invention, there is provided a magnetic element for demonstrating magnetic phenomena comprising a cylindrical rod having a ferromagnetic core whose ends are exposed, and a cylindrical layer of non-magnetic material which has substantial thickness and which covers the cylindrical surface of the rod, the rod having a length less than one centimeter.

Since the cylinder surface of the core is covered with a layer of non-magnetic material, adjacent elements will have little tendency to pair together and become magnetically neutral or to join together with overlapping ends. This said tendency will be reduced because the poles of adjacent magnetic elements will, by virtue of the non-magnetic covering, usually be spaced further from each other than would otherwise be the case. The form of the magnetic elements of the present invention, moreover, is better adapted for demonstrating magnetic phenomena such as lines of force than are particles such as iron filings.

The diameter of the magnetic element preferably does not exceed two thirds (and desirably does not exceed one third) of the length thereof. The said length, moreover, preferably does not exceed 3 mm. while its diameter may be less than one millimetre, and preferably does not exceed 0.5 mm. Thus the core may, for example, havs a diameter of 0.008 inch, or 0.2 mm., and a length of between 2.0 and 1.6 mm.

The specific gravity of the whole element preferably does not exceed 2.5 and preferably does not exceed 1.0 so that it is buoyant in or on an aqueous liquid.

The cylindrical surface of the core of each element may, for example, be covered with a layer of synthetic resin material, such for example, as polyethylene or more particularly, with a low friction material such as polytetrafluoroethylene or the like.

The core may be formed of a ferro-magnetic material (such, for example, as stainless steel) which is resistant to corrosion when immersed in an aqueous liquid.

The ends of the magnetic element may be rounded or radiused.

The ends of the core need not extend to the ends of the magnetic element. Thus the ends of the magnetic element may, for example, be concave.

The invention also comprises apparatus for demonstrating magnetic phenomena comprising a sealed container within which are disposed a plurality of magnetic elements as set forth above, the container having a transparent portion through which the disposition of the magnetic elements may be seen. Preferably there is a marked contrast between the colour of the magnetic elements and that of the base of the container. Thus the magnetic elements may be coloured black and the said base may be coloured white.

The internal depth of the container will for most purposes be made less than twice the diameter of the magnetic elements.

The surface of the base of the container which faces the magnetic elements may be provided with a layer of low friction material. The low friction material may be polytetrafluoroethylene which gives a translucent effect.

The container may contain a liquid in or on which the magnetic elements are disposed and which, does not corrode the cores of the latter. Thus the liquid in the container may be water to which has been added a quantity of a wetting agent, or an industrial alcohol, such as isopropyl alcohol, having low surface tension.

The said liquid may contain thixotropic material.

At least one electrical conductor may, if desired, pass through, or may be mounted adjacent to, the container.

The container may be annular. In this case, the conductor may be wound around the annular container in the form of a coil, the magnetic elements having cores of highly retentive magnetic material.

Alternatively, the annular container may surround a spherical member having magnetic poles representative of the terrestrial magnetic poles.

Alternatively in another application, the magnetic elements have cores of low magnetic retentivity.

Figure 2:
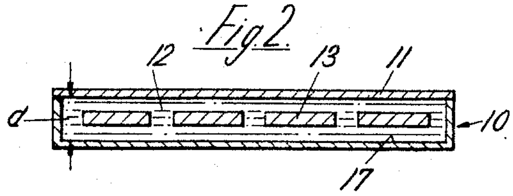
Figure 5:
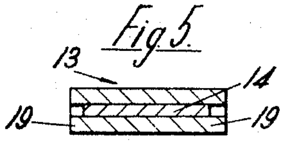
Figure 6:
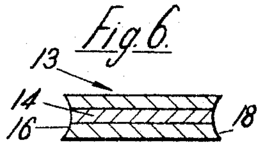
Figure 7:
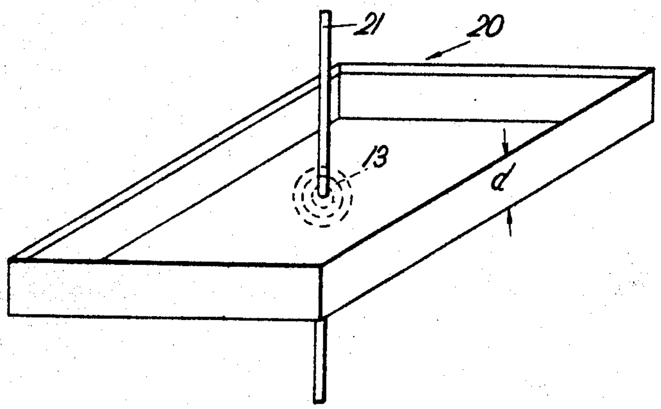
Figure 8:
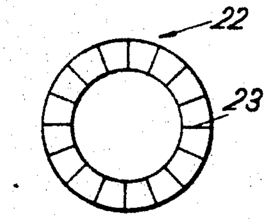
Figure 9:
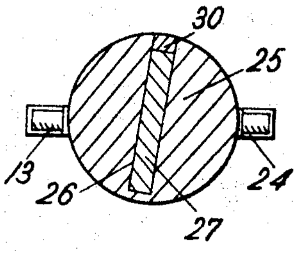

The invention is illustrated, merely by way of example, in the accompanying drawings, in which:

FIGURE 1 is a highly diagrammatic perspective view of an apparatus, according to the present invention, for demonstrating magnetic phenomena, FIGURE 2 is a highly diagrammatic section taken on the line 2—2 of FIGURE 1, FIGURES 3–6 are highly diagrammatic sections on a very much magnified scale of different magnetic elements which may employed in the apparatus of FIGURES 1 and 2, FIGURE 7 is a highly diagrammatic perspective view of another apparatus for demonstrating magnetic phenomena, FIGURE 8 is a highly diagrammatic plan view of yet another such apparatus, and FIGURE 9 is a highly diagrammatic sectional elevation of still another such apparatus.

Referring first to FIGURES 1 and 2, an apparatus for demonstrating magnetic phenomena comprises a "flat" box-like container 10, e.g. of synthetic resin material, having a transparent upper surface or lid 11, e.g. of glass. The container 10 contains a quantity of a liquid 12 in or on which float a plurality of magnetic elements 13. The liquid 12, which may, if desired, be omitted, may, for example, be water, to which has been added a quantity of a wetting agent, or an industrial alcohol (such as isopropyl alcohol) having low surface tension.

The internal depth *d* of the container 10 is preferably less than twice the diameter of the magnetic elements 13.

The base of the container 10 has a surface 17 which faces the magnetic elements 13 and which may be coated with a layer of polytetrafluoroethylene or like low friction material. The magnetic elements 13, moreover, may be coloured black and the surface 17 may be white or translucent, so that magnetic elements can easily be seen against or through the surface 17.

Figure 3:
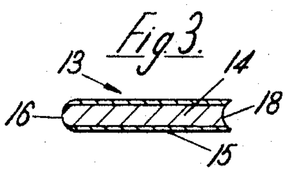

As shown in FIGURE 3, each element 13 may consist of a cylindrical rod having a ferro-magnetic core 14, e.g. of iron or steel, whose cylindrical surface is covered with a layer 15 of non-magnetic material such for example as a synthetic resin. One particularly suitable synthetic resin is cellular polyethylene, and in this case it may be arranged that the specific gravity of the whole element 13 is less than 1.0. Another particularly suitable synthetic resin is polytetrafluoroethylene or like low friction material. Whatever non-magnetic material is used, it is preferably arranged that the said specific gravity does not exceed 2.5.

The ferro-magnetic material of the core 14 should be stainless steel or some other ferro-magnetic material which is resistant to corrosion when immersed in the liquid 12.

As will be seen the element 13 has a convexly rounded end 16 and a concavely rounded end 18, the ends of the core 14 being exposed at the ends 16, 18.

Figure 4:
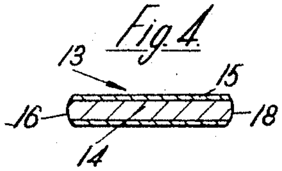

Alternatively, the element 13 may, as shown in FIGURE 4, have ends 16, 18 each of which is convexly rounded.

Another alternative is for the magnetic elements 13 to be formed, as in FIGURE 5, so that the ends of the cores 14 do not extend to the ends 19 of the magnetic elements 13. This may be achieved by cutting up a length of resin coated ferromagnetic wire to form the magnetic elements 13 and then placing the magnetic elements 13 in a liquid (e.g. an acid) which chemically attacks the ends 19 of the cores 14 but which does not attack the resin coating.

Yet a further alternative is shown in FIGURE 6 in which each of the ends 16, 18 of the magnetic elements 13 has been made concave by the use of a suitable cutter (not shown).

As will be appreciated, the elements shown in FIGURES 5 and 6 have poles which are spaced from the ends thereof whereby adjacent such elements will have little tendency to pair together and become magnetically neutral.

The magnetic elements 13, whether formed as in any of FIGURES 3 to 6, have a length not exceeding one centimetre, and preferably not exceeding 3 mm., and a diameter which does not exceed two thirds (and preferably does not exceed one third) of their length. Thus the diameter may be less than one millimetre and preferably does not exceed 0.5 mm.

As will be appreciated, the magnetic elements 13, by reason of their coatings 15 and by reason of their floating in or on the liquid 12, move relatively freely with respect to each other in the liquid 12 so as to be adapted to demonstrate magnetic phenomena. Thus, even when they have themselves a low degree of magnetic retentivity, they will, in the absence of an external magnetic field, so dispose themselves as to form rings illustrating the phenomenon of magnetic domains. When, however, they are subjected to an external magnetic field, these rings break up and each magnetic element 13 assumes a position corresponding to the external magnetic force acting on it and thus exhibits the phenomenon of induced magnetism.

Thus, for example, there is shown in FIGURE 1 the form adopted by the magnetic elements 13 when a bar magnet (not shown) is placed either below or above the container 10. The magnetic elements 13 will in this case align themselves in curves beginning and ending near the poles of the said bar magnet, these curves representing the lines of magnetic force generated by the magnet.

Similarly, when the container 10 is placed over the end of the said bar magnet, the magnetic elements will align themselves to form straight lines radiating from the centre in star form.

The liquid 12 may contain thixotropic material such, for example, as carboxy methyl cellulose. In this case, the elements 13 will tend to remain fixed in position, but will be displaceable when the container 10 is shaken and subjected to a magnetic field.

In FIGURE 7 there is shown a container 20 which is generally similar to that of FIGURE 1 and which will not therefore be described in detail. Passing vertically through the centre of the container 20, however, is an electrical conductor 21. As will be appreciated, when an electric current is passed through the conductor 21, the magnetic elements 13 form concentric circles and thus demonstrate the magnetic effect of an electric current passing along a conductor.

Since the depth *d* of the containers 10 and 20 is less than twice the diameter of the magnetic elements 13, the latter will be disposed in a single plane and will thus more easily demonstrate the particular magnetic phenomena. However, if it is wished to demonstrate that magnetism penetrates all space, the depth *d* may be substantially greater than twice the said diameter.

In FIGURE 8 there is shown another apparatus for demonstrating magnetic phenomena, the said apparatus comprising a "flat" annular container 22. The container 22 is formed in a generally similar way to the containers 10, 20, that is to say it has a transparent lid, and it contains a liquid in which the magnetic elements 13 are buoyant. In the FIGURE 8 construction, however, an electrical conductor 23 is coiled around the annular container 22, and the magnetic elements 13 have cores of highly retentive magnetic material.

Prior to the passage of a current through the conductor 23, the magnetic elements 13 in the container 22 form chains some of which are closed loops partially demonstrating the phenomenon of magnetic domains.

When, however, current is passed through the conductor 23, the chains and loops formed by the magnetic elements 13 are first distorted and, as the current is increased, are gradually broken up. The magnetic elements 13 then begin to align themselves in the form of circles which are concentric with the container 22. A stage is finally reached where any increase in the current level makes no difference to the alignment of the magnetic elements 13. This, therefore, demonstrates the phenomenon of magnetic saturation.

If the current is now reduced, until there is no further current flow, the magnetic elements 13 remain aligned in circles concentric with the container 22. This, therefore demonstrates the phenomenon of remanent magnetism.

It the current in the conductor 23 is now reversed, and is gradually increased, it will force the magnetic elements 13 to cease to be aligned in circles concentric with the container 22 and as a result they will form loops illustrating magnetic domain. This, therefore, demonstrates the phenomenon of coercive force.

If the current is increased still further, the condition of magnetic saturation will be brought about, it being observed that the magnetic elements have turned through 180° compared with their position in relation to the container 22 when the current first formed them into rings concentric with the container 22.

If the current in the conductor 21 is periodically increased, reduced and reversed cyclically, the magnetic elements 13 will be seen to pass through the various states of remanent magnetism, coercive force, and saturation so as to illustrate physically the magnetic phenomenon of hysteresis.

In FIGURE 9 there is shown a "flat" annular container 24 which is similar to the container 22 but which surrounds a wooden or synthetic resin spherical member 25. The member 25 has a blind hole 26 in which is located a bar magnet 27 which is retained within the hole 26 by a plug 30. The member 25 is representative of the earth, while the bar magnet 27 is so arranged that the positions of its poles are representative of the terrestrial magnetic poles. The magnetic elements 13 in the container 24 will thus arrange themselves to demonstrate the phenomenon of magnetic declination.

The spherical member 25 may be made in two halves, e.g. of synthetic resin material, and arranged to enclose the bar magnet 27. A map of the earth may be formed on the outer face of the spherical member 25.

If a very thin container 10 is employed, and the magnetic elements 13 are formed by coating the thinnest possible ferro-magnetic wires with suitable synthetic resins, the said wires being preferably of low magnetic retentivity, the apparatus may be used to illustrate and solve a number of problems in electrical engineering normally capable of solution only by advanced methods of calculation.

Figure 10:
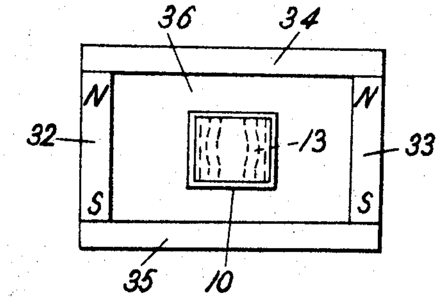

To this end, there is shown in FIGURE 10 an apparatus comprising two parallel spaced bar magnets 32, 33 whose like poles are opposite each other, the bar magnets 32, 33 being bridged by steel or soft iron members 34, 35. This assembly forms a "window" 36 in which there is a uniform magnetic field whose lines of force are parallel, a container 10, provided with the magnetic elements 13, being disposed within the "window" 36. If now a steel stamping corresponding to a pole and another steel stamping representing a slotted armature of an electric motor are together placed under the container 10 of FIGURE 10, the magnetic elements 13 in the container 10 will align themselves above the gap between the stampings and above the slots in the armature generally in accordance with the magnetic lines of force.

Magnetic lines of force, electrical lines of force, lines of flow in aerodynamics and hydrodynamics and lines of stress in elasticity are determined by the same differential equation, namely Laplace's Equation. It is therefore possible to use the apparatus illustrated in FIGURE 10 to solve problems in hydrodynamics, aerodynamics, electricity, elasticity, and in other fields.

Thus, if, for example, it is desired to know the position of the lines of stress in a steel beam which is being subjected to compression and which has a hole in it, this may be achieved by making a ferromagnetic disc whose shape corresponds to that of the said hole and placing this disc beneath the container 10 which is disposed in the parallel magnetic field provided by apparatus shown in FIGURE 10. The magnetic elements 13 will then arrange themselves in a pattern corresponding to the said lines of stress.

I claim:

1. Apparatus for demonstrating magnetic phenomena comprising a sealed container within which are disposed a plurality of magnetic elements, the container having a transparent portion through which the disposition of the magnetic elements may be seen, each said magnetic element comprising a cylindrical rod having a ferromagnetic core whose ends are exposed, and a layer of non-magnetic material which covers the cylindrical surface of each rod, each rod having a length less than one centimeter.

2. Apparatus as claimed in claim 1 in which there is a marked colour contrast between the colour of the magnetic elements and that of the base of the container.

3. Apparatus as claimed in claim 1 in which the internal depth of the container is less than twice the diameter of the magnetic elements.

4. Apparatus as claimed in claim 1 in which the surface of the base of the container which faces the magnetic elements is provided with a layer of low friction material.

5. Apparatus as claimed in claim 1 in which the container contains a liquid.

6. Apparatus as claimed in claim 5 in which the liquid contains thixotropic material.

7. Apparatus as claimed in claim 1 in which at least one electrical conductor is mounted adjacent the container.

8. Apparatus as claimed in claim 7 in which the container is annular and the conductor is wound around it in the form of a coil, the magnetic elements having cores of highly retentive magnetic material.

9. Apparatus as claimed in claim 1 in which the container is an annular container which surrounds a spherical member having magnetic poles representative of the terrestrial magnetic poles.

10. Apparatus as claimed in claim 1 in which the magnetic elements have cores of low magnetic retentivity.

References Cited

UNITED STATES PATENTS

| | | | |
|---|---|---|---|
| 1,595,801 | 8/1926 | McDonald | 335—306 X |
| 2,277,057 | 3/1942 | Bach | 35—18 X |
| 2,518,635 | 8/1950 | Peterson | 335—306 |
| 2,524,804 | 10/1950 | Irby | 35—19 |
| 3,045,362 | 7/1962 | Capps | 35—19 |
| 3,103,751 | 9/1963 | McDonald | 35—61 |

FOREIGN PATENTS 894,516 10/1953 Germany.

EUGENE R. CAPOZIO, *Primary Examiner.*

H. S. SKOGQUIST, *Assistant Examiner.*

U.S. Cl. X.R.

335—306